United States Patent [19]
Larson

[11] 4,014,244
[45] Mar. 29, 1977

[54] FLATTENED ROUND END STAPLE
[75] Inventor: Charles O. Larson, Sterling, Ill.
[73] Assignee: Charles O. Larson Co., Sterling, Ill.
[22] Filed: Oct. 22, 1975
[21] Appl. No.: 624,657
[52] U.S. Cl. .................................. 85/49; 85/21; 85/30
[51] Int. Cl.² .................................. F16B 15/06
[58] Field of Search .............. 85/49, 30, 21; 59/73, 59/74, 77

[56] References Cited
UNITED STATES PATENTS

| 274,481 | 3/1883 | Frost | 85/49 |
|---|---|---|---|
| 328,515 | 10/1885 | Perry | 85/30 |
| 915,586 | 3/1909 | Garrity | 85/21 |
| 1,201,559 | 10/1916 | Columbia | 85/49 |
| 1,410,076 | 3/1922 | Overbury | 85/30 |
| 2,351,608 | 6/1944 | Greenwood | 85/49 X |
| 3,267,660 | 8/1966 | Matthews | 59/77 |
| 3,605,402 | 9/1971 | Larson | 85/49 X |
| 3,800,654 | 4/1974 | Larson | 85/49 |
| 3,821,919 | 7/1974 | Knohl | 85/49 |

FOREIGN PATENTS OR APPLICATIONS

| 1,222,981 | 2/1971 | United Kingdom | 85/49 |
|---|---|---|---|

OTHER PUBLICATIONS
Larson Staples, Catalog No. 968, Sept. 1, 1968, Chas. O. Larson Co.
Larson Supplier to Industry, Catalog No. 5-969, Sept. 1, 1969, Chas. O. Larson Co.

Primary Examiner—Roy D. Frazier
Assistant Examiner—Rodney H. Bonck
Attorney, Agent, or Firm—Olson, Trexler, Wolters, Bushnell & Fosse, Ltd.

[57] ABSTRACT

A staple for attaching drop-wire molding or the like to a telephone pole is provided. To provide strength and easy, true driving action, a straight bight portion and mediate portions of perpendicular tines have opposed flat surfaces which intersect opposed rounded surfaces. Tapering tine tongues are partly defined by inner flat surfaces which intersect the outer surfaces in the same plane as the extended outer flat surfaces of the tine mediate and tine tongue portions. To encourage staple retention, ratchet-like teeth are formed on the outer tine tongue surfaces.

1 Claim, 11 Drawing Figures

U.S. Patent  Mar. 29, 1977  4,014,244
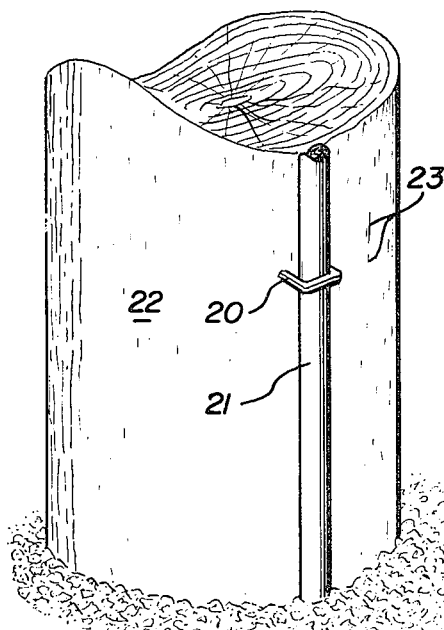
FIG.1
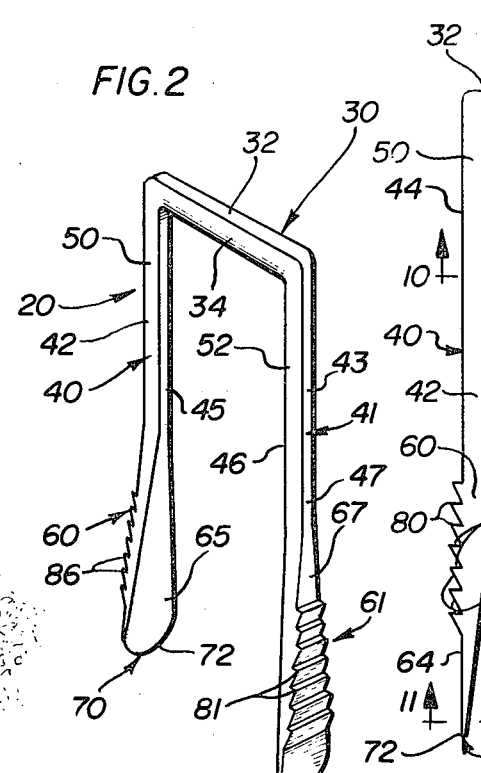
FIG.2
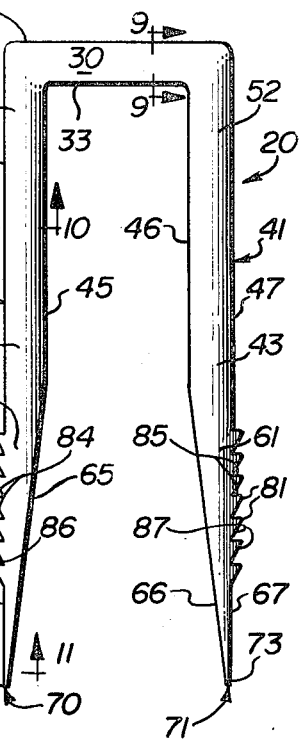
FIG.3
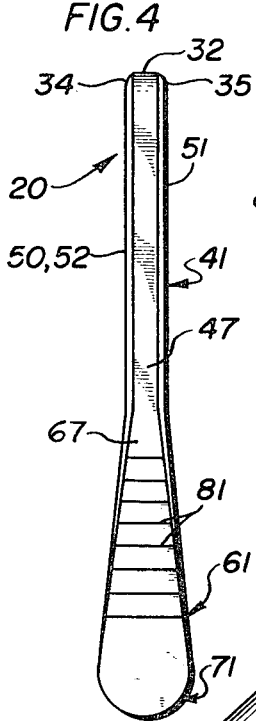
FIG.4
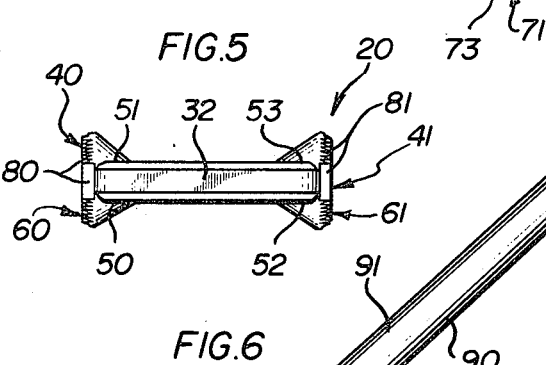
FIG.5
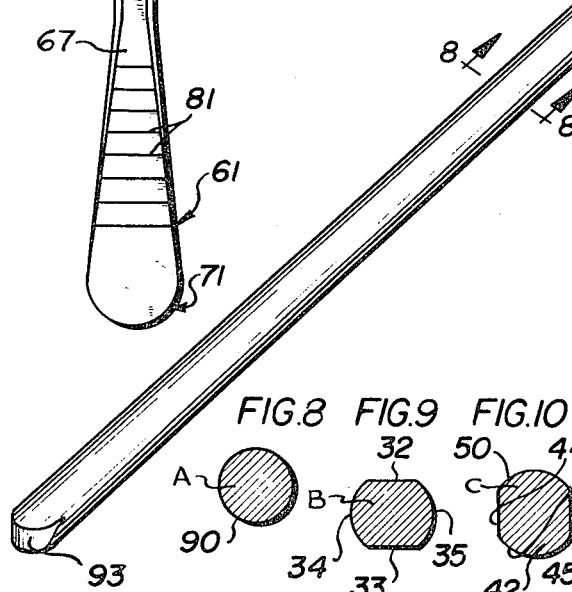
FIG.6
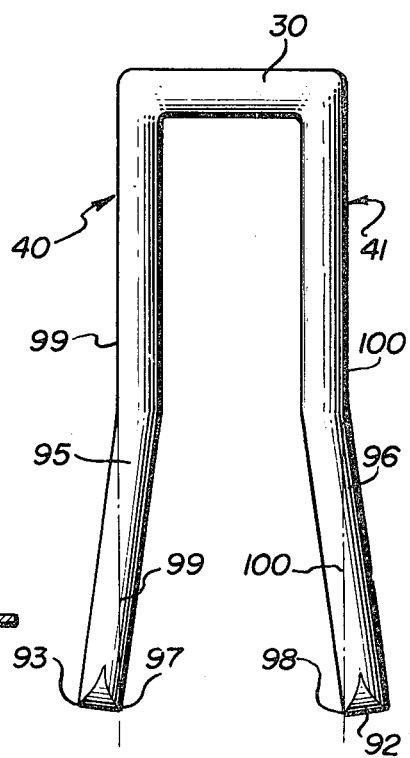
FIG.7
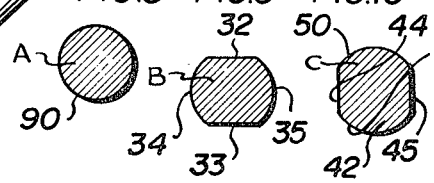
FIG.8 FIG.9 FIG.10 FIG.11
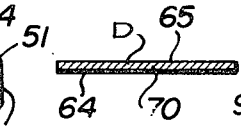

FLATTENED ROUND END STAPLE

BACKGROUND OF THE INVENTION

The hardware market has long offered many industrial staple and spike devices for fastening small objects to telephone poles and the like. However, extensive experience in manufacturing and using these staples have disclosed a number of deficiencies. To overcome these deficiencies, the fasteners disclosed in U.S. Pat. Nos. 3,403,592 and 3,800,654, among others, have been successfully offered.

It is the general object of the present invention to provide a staple of increased utility and greater effectiveness which is especially adapted to attach ground wire molding or similar articles to telephone poles or the like.

It is a more specific object of the invention to provide a staple which can be driven straight with relative ease; i.e., to provide a staple which can be driven in a desired direction with relative accuracy by even inexperienced or unskilled personnel.

As associated object is to provide such a staple which can be driven into its final position with relatively little effort. An ancillary object is to provide such a staple which resists twisting, spreading and collapsing as it is driven into place. A correlated object is to provide a staple which resists pinching the wire or other article held between the staple tines as the staple is being driven.

Yet another object is to provide a staple which can be driven into a telephone pole or like wooden object without cutting into or destroying the wood grain. A similar object is to provide such a staple which resists pulling loose from its final driven position even when subjected to relatively severe loads. A related object is to provide such a staple which resists pulling loose even during a long use lifetime. Such lifetimes can extend for 20 or more years under some applications.

A related object is to provide such a staple which can be driven and utilized so easily as to increase the productivity of the workers who are using the staple.

An additional object is to provide a staple which minimizes the likelihood of injury to the user's hand or damage to a user's work glove, clothes or the like. A connected object is to provide a staple which obviates the use of a sharp needle-like point on the staple tine tip.

Still another object is to provide a staple which can be utilized in construction locations previously suggesting the use of a strap and nail device.

Yet another object is to provide a staple which realizes the foregoing goals and yet is made from a wire or rod or similar metal stock which is smaller, lighter, and less expensive than that which has been required in some formerly offered fastener devices. A collateral object is to provide a staple which can be manufactured with minimal scrap or waste production.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing the novel staple of the present invention as it appears when driven into final place in and on a telephone pole use environment;

FIG. 2 is a perspective view of the novel staple itself;
FIG. 3 is a front elevational view of the novel staple;
FIG. 4 is a side elevational view of the novel staple;
FIG. 5 is a top plan view of the novel staple;
FIG. 6 is a perspective view of the metallic rod material from which a staple can be formed;
FIG. 7 is a side elevational view of a preliminary shape prepared during the manufacture of the staple;
FIG. 8 is a cross-sectional view taken substantially in the plane of line 8—8 in FIG. 6;
FIG. 9 is a cross-sectional view taken substantially in the plane of line 9—9 in FIG. 3;
FIG. 10 is a cross-sectional view taken substantially in the plane of line 10—10 in FIG. 3; and
FIG. 11 is a cross-sectional view taken substantially in the plane of line 11—11 in FIG. 3.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

As shown in FIG. 1, the novel staple 20 embodying the present invention is especially adapted for use in attaching a wooden or plastic ground wire molding or other article 21 to a telephone pole 22 or similar structure. It will be noted that this base or foundation telephone pole 22 is wooden, and has wood grain 23 extending in a given orientation. As will be explained further below, proper construction and use of this staple 20 permits its insertion partially into the pole 22 without cutting the wood grain 23.

To encourage easy and true staple driving in accordance with the invention, a relatively planar or flat hitting area is provided. To this end, the staple includes a straight bight portion 30 having opposed flat top and bottom surfaces 32 and 33 respectively which are separated by opposed round side surfaces 34 and 35. The flattened bottom bight surface 33 permits the staple to be driven snugly against the retained object 21.

Extending substantially perpendicularly from the bight portion 30 are a pair of tines 40 and 41. Like the bight portion 30, each tine mediate portion 42 and 43 is defined by opposed outer and inner flat surfaces 44-47 respectively. Remaining portions of the tine surfaces are defined by opposed rounded side surfaces 50-53. As shown more clearly in FIG. 9, the bight mediate portion cross-sectional configuration B has the aspect of a crushed circle including two rounded sides 34, 35 intersected by two parallel but spaced apart straight chordal lines 32, 33. Similarly, the tine mediate portion 42 cross-section of the tine 40 shown in FIG. 10 can be defined as a crushed circle including two rounded sides 50, 51 and two intersecting chordal lines 44, 45.

Each tine 40, 41 includes, at a terminal end, a tapering tongue 60, 61. Again, each tongue is at least partly defined by outer and inner flat surfaces 64-67 respectively, which extend from the corresponding tine mediate portion flat surfaces 44-47 respectively.

In accordance with another aspect of the invention, the staple is formed to discourage squeezing the retained object 21 between the tines 40 and 41 as the staple is driven into its final location. To this end, the tongue inner flat surfaces 65 and 66 taper or spread outwardly toward the outer flat surfaces 64 and 67 so as to intersect them in a line lying in that same plane as the extended outer flat surface of the tine mediate portions 44 and 47 and the tine tongue portions 64 and 67. Thus, as the staple 20 is driven into the telephone pole 22, a tine splaying or expanding action is encouraged which prohibits pinching the molding 21 between the staple tine legs 40 and 41. However, this action is controlled by the tine mediate portions 42 and 43 so as to virtually eliminate undesirable staple spreading.

Each tine tongue 60 and 61 terminates in a tongue tip 70 and 71. In carrying out the invention, true and straight staple insertion into the grained telephone pole 22 is encouraged by forming these tine tips in the shape of elongated parallel cutting edges 72 and 73 of substantially semicircular configuration. As an additional inventive feature, these elongated cutting edges 72, 73 also discourage injury to the user's hand and damage to the user's work gloves or clothing since no sharp points are provided.

These parallel elongated cutting edges 72, 73 can be easily driven into the wooden workpiece 22 so as to split the grain in only minor respect. When the staple edges 72, 73 are aligned generally parallel to the wood grain 23, and the staple is then driven progressively into the telephone pole 22, a small wedging or splitting effect occurs in the direction of the grain 23. No wood grain structure crushing or gouging is required as is necessary with many other staples. Easy insertion is enhanced and proper staple manipulation and orientation by even inexperienced personnel is encouraged by orienting the cutting edges 72, 73 parallel to one another but perpendicularly to the plane of the planar staple itself.

To retain the staple in its final position in the telephone pole 22 against even relatively severe loads and over a relatively long use life in accordance with yet another aspect of the invention, a plurality of ratchet-like teeth 80, 81 are formed on the outer flat tine tongue surfaces 60 and 61 respectively. To provide maximum wood-engaging surface, each tooth extends fully across the tongue face 64, 67, thereby forming a series of teeth of progressively greater length in array from the tine mediate portions 40 and 41 to the respective tine tongue tips 70 and 71. To encourage easy staple insertion but discourage easy extraction, each tooth 80 and 81 is at least partly defined by a substantially planar surface 84, 85 extending substantially perpendicularly to the outer flat tine tongue surface 64, 67. The remaining portion of the tooth is defined by another substantially planar surface 86, 87 extending obliquely to the first tooth surfaces 84, 85, thereby forming a series of ratchet-like teeth extending outwardly of the tine tongue 60 and 61.

As can be envisioned from particular reference to FIGS. 6 and 7, this novel staple 20 can be formed with relative ease and with no waste material from a length of metallic rod or wire stock material 90. During staple formation, a blank 91 of desired length is drawn and is provided with rounded ends 92 and 93. A preliminary staple blank formation can be provided similar to that shown in FIG. 7 which has a preliminary straight bight portion 30 and tine portions 40 and 41. These tine portions are provided with unformed terminal ends 95 and 96 which are preliminarily splayed from one another as illustrated. Ease of final staple configuration can be enhanced by arranging this splay so that the inner terminal corners 97 and 98 of the tine terminal portions 95 and 96, respectively, lie in the planes 99 and 100 which define the outer surfaces of the tine mediate portions 40 and 41.

During staple formation, the rod stock 90 has a circular configuration A as shown in FIG. 8. To minimize or eliminate machining and the attendant material waste in carrying out the invention, the included area B and C within the bight and tine cross-sections respectively are substantially equal to the circular cross-sectional area A of that circle which defines the metallic rod material before the rod material 90 is formed into the staple. Further, as is illustrated in FIG. 11, the tine tips 70 and 71 assume the cross-sectional aspect of an elongate rectangle. Again to avoid material wastage, the rectangle defines an interior D substantially equal to the area A defined by a circle which defines the metallic rod material cross-section before formation of the staple from the rod material. As an inventive consequence, then, only metal forming operations are thus needed in making this staple, and wire or rod of relatively small size can be used as a basic or starting stock. By appropriate cold forming operations such as upsetting, the teeth 80 and 81, too, can be formed without machining or material wastage. The rounded rod stock ends 92 and 93 are of such a preliminary shape as to readily assume the terminal cutting edges 72 and 73 during final staple formation.

The invention is claimed as follows:

1. A staple formed without waste from a length of metallic rod stock material having a given cross-sectional area, for insertion into a telephone pole or like grained object, the staple comprising a straight bight portion having opposed flat top and bottom surfaces and opposed rounded side surfaces defining a bight cross-section of given area substantially equal to the rod stock material cross-sectional area, and a pair of tines extending substantially perpendicularly from the bight portion, each tine being defined by opposed outer and inner flat surfaces and opposed rounded side surfaces over a mediate portion defining a tine cross-section of given area substantially equal to the staple bight cross-sectional area, each tine including a tapering tongue at least partly defined by an outer and an inner flat surface extending from the mediate portion surfaces and diverging unnotched, straight side surfaces, the inner flat surface tapering toward the outer flat surface to intersect the outer flat surface in a line lying in the same plane as the extended outer flat surface of the tine mediate portion and tine tongue portion, and a tongue tip at the terminal tine end having an elongate, substantially rectangular cross-sectional area substantially equal to the staple bight and tine cross-sectional areas and an elongate cutting edge of substantially semi-circular configuration, each tine tongue tip lying in a plane parallel to the plane of the other tine tongue tip and perpendicular to the plane of the staple itself, for insertions between telephone pole grain striations, and a plurality of ratchet teeth formed only on the outer flat tine tongue surface, the teeth on each tine extending between said diverging side surfaces, thereby forming a series of teeth, each tooth having a greater length than the previous tooth from the tine mediate portion to the tine tongue tip, each tooth extending out of the plane of the outer flat tine tongue surface and being at least partly defined by a first substantially planar surface extending perpendicularly to the outer flat tine tongue surface and by another substantially planar surface extending obliquely to the first tooth surface, and said other surface of the lowermost tooth extending obliquely to the tine terminal elongate cutting edge, thereby forming a series of sturdy, agressive, ratchet-like teeth extending outwardly of the tine tongue.

* * * * *